May 5, 1959

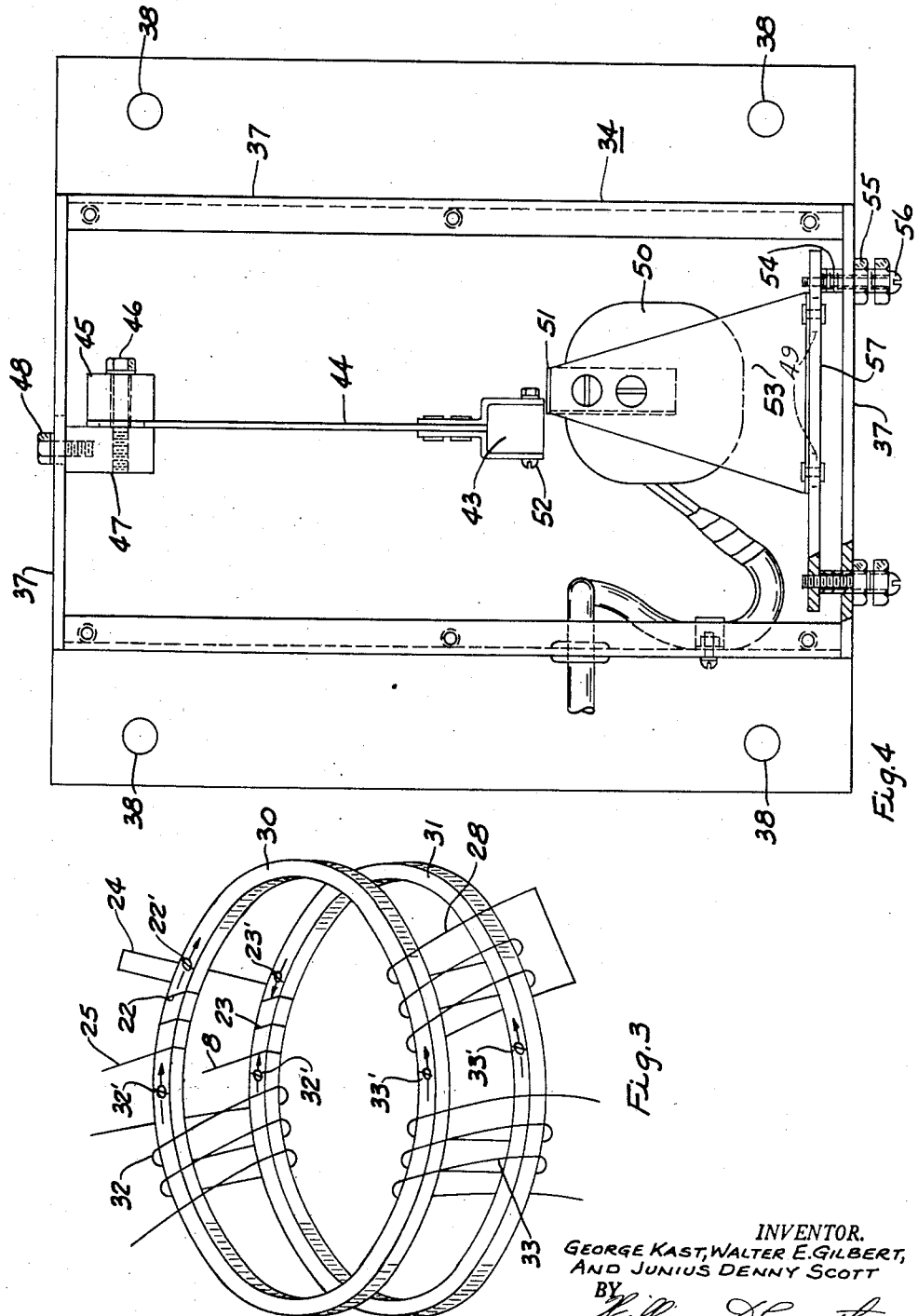

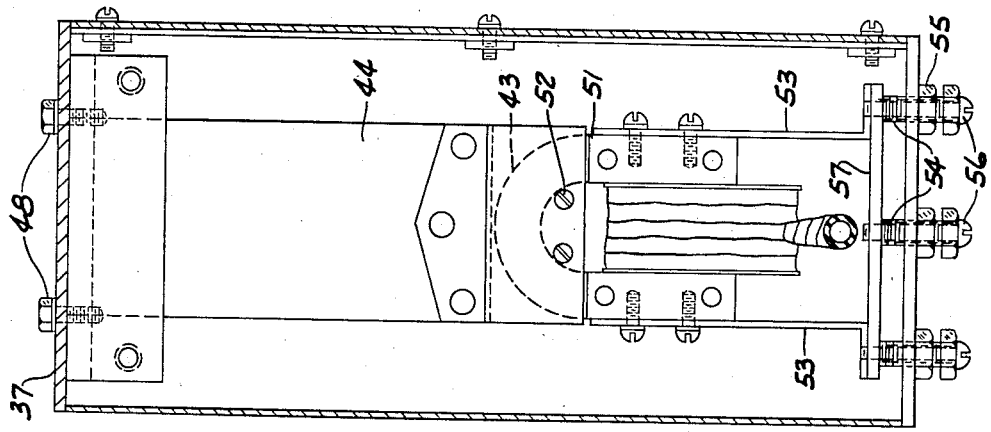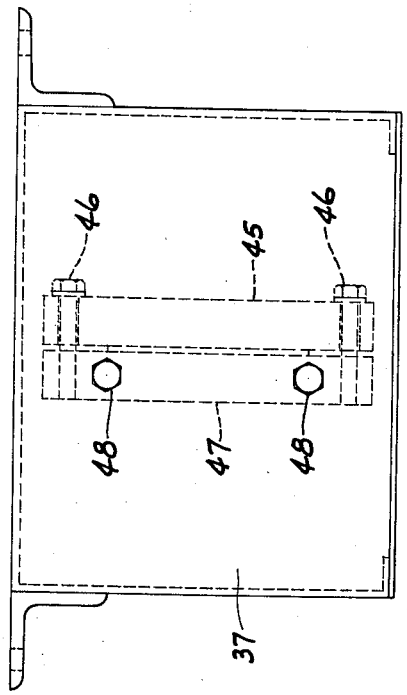

G. KAST ET AL 2,885,617

VIBRATORY MOTOR MEANS HAVING ELECTRONIC CONSTANT
AMPLITUDE FEEDER REGULATOR

Filed July 20, 1956

INVENTOR.
GEORGE KAST, WALTER E. GILBERT,
AND JUNIUS DENNY SCOTT
BY

THEIR ATTORNEY

United States Patent Office 2,885,617,
Patented May 5, 1959

2,885,617

VIBRATORY MOTOR MEANS HAVING ELECTRONIC CONSTANT AMPLITUDE FEEDER REGULATOR

George Kast and Walter E. Gilbert, Indiana, and Junius Denny Scott, Homer City, Pa., assignors to Syntron Company, Homer City, Pa., a corporation of Delaware Application July 20, 1956, Serial No. 599,061

20 Claims. (Cl. 318—128)

This invention relates generally to current impulse controllers for governing the magnitude and time between current impulses for controlling an operating circuit regardless of changes in voltage and other factors.

This controller may be employed with advantage to obtain a constant rate of feed of material from a vibratory feeder by controlling the emplitude of the feeder. This application is particularly important because line voltage fluctuations as well as load variations on the feeder itself have a tendency to change the amplitude of the feeder and regardless which variation occurs the controller comprising this invention maintains a constant rate of feed.

The automatic vibration amplitude control comprising this invention maintains a desired setting of feed regardless of voltage changes, temperature changes or changes in material, head or load on the feeder trough.

This invention includes an electromagnetic pickup in the form of a sensing device mounted on the feeder itself which is in the form of a generator providing a current output commensurate with the feeder amplitude and changes thereof.

This invention also contemplates a new and novel magnetic amplifier having superimposed magnetic cores, each having independent regulating windings and independent control and reference windings wound around both cores together with a short-circuited winding. This magnetic amplifier is capable of receiving the signal of the amplitude pickup generator, pit the same against a reference current and provide an electronic control that produces the proper current impulse for operating the feeder to deliver the proper amount of material. The reference winding has a constant voltage across it regardless of line voltage variation, whereas the amplitude pickup generator determines any change in the weight of the material being fed and these two factors are integrated by the magnetic amplifier to properly control the magnitude and to immediately advance or retard the firing of the electronic device providing the current impulses to operate the feeder.

This invention also contemplates a new and novel amplitude pickup generator for use on a tuned vibratory feeder which determines any change in the amplitude of a feeder and reflects the same in the generating signal. This amplitude pickup generator is composed of a permanent magnet armature suspended on a tuned resonant reed which when vibrated will reciprocate across the pole faces of an electromagnetic winding that is adjustably mounted relative to the reciprocal armature so as to properly coordinate a generated signal for the operation of the feeder, the reciprocation of which is effective in driving the tuned resonant reed of the generator. Since the amplitude pickup generator and the source for the reference winding are actually alternating current, it is necessary to convert these alternating current signals to that of a direct current which may be accomplished through some form of rectification such as by a full wave dry disc rectifier. If, however, the signals can be directly interpreted into direct current, a converter may not be necessary for the signal itself may be supplied in whole or part to the magnetic amplifier.

Other objects and advantages of this invention appear hereinafter in the following description and claims.

The accompanying drawings show for the purpose of exemplification without limiting the invention or claims thereto certain practical embodiments illustrating the principles of this invention wherein:

Fig. 3 is a diagrammatic view of the magnetic amplifier comprising this invention.

Figure 4 is a view in side elevation of the amplitude pickup generator comprising this invention.

Fig. 5 is an end elevation of the structure shown in Fig. 4.

Fig. 6 is a top plan view of the reed mounting shown in Figs. 4 and 5.

Figure 1:
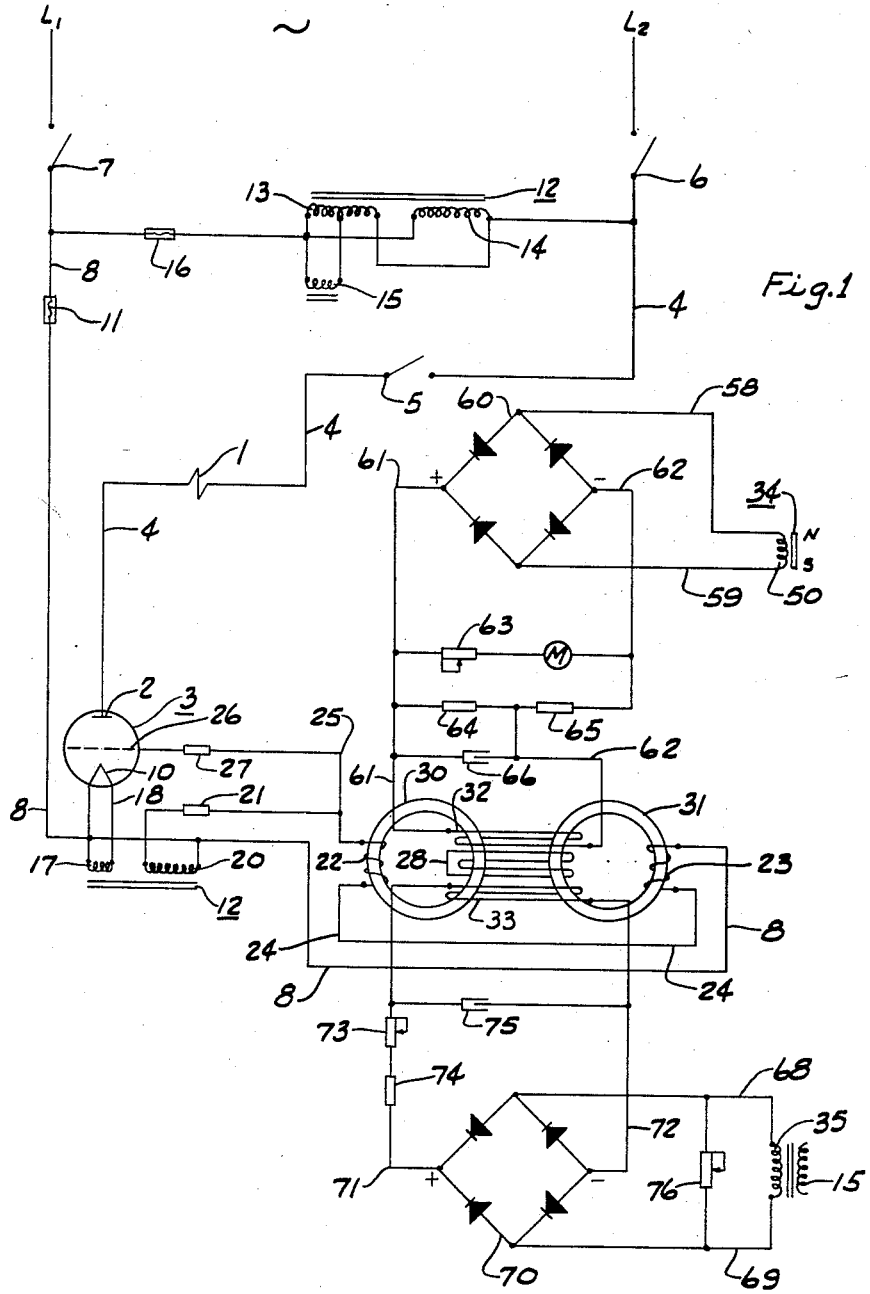
Fig. 1 is a view of a circuit diagram of the electronic constant amplitude regulator comprising this invention.

Referring to Fig. 1 of the drawings the electromagnet 1 of the feeder motor is shown to be in the circuit of the anode 2 of the triode 3 being connected by the line 4 and the switch 5 to one side of the alternating current supply line indicated at L2 and connected by the switch 6. The other side of the alternating current supply line that is indicated at L1 and connected by the switch 7 is connected through the line 8 to one side of the cathode 10 of the triode after having passed through the fuse element 11. A transformer 12 having primary windings 13 and 14 is connected between the alternating current source through the switches 6 and 7 through fuse member 16.

The primary 13 is the primary for the filament transformer, the secondary 17 of which supplies a current to the cathode 10 through the line 18. The primary 14 is connected in multiple with the primary 13 for 220 volts A.C. and the secondary 20 from this transformer supplies through the resistance 21 an alternating voltage across the regulating windings 22 and 23 of the magnetic amplifier. The line 8 being connected to one side of the secondary 20 is also directly connected to one end of the regulating winding 23 the other end of which is connected by the line 24 to one end of the regulating winding 22, thereby placing coils 22 and 23 in series and the other ends of the coil 22 is connected by the line 25 to the control grid 26 of the triode 3 through the limiting grid resistance 27.

A short-circuiting or antihunt coil 28 is wound about both of the cores 30 and 31 of the magnetic amplifier. The control winding 32 and the reference winding 33 are likewise wound around both cores 30 and 31. The control winding being supplied with this signal through the control converter through the amplitude pickup generator as indicated at 34 and the reference winding being supplied as shown in Fig. 1 with the reference current through the reference converter from the secondary 35 the alternating current transformer the primary of which is indicated at 15.

Magnetic amplifier which is shown more in detail in Fig. 3 is made up of the two ring cores 30 and 31 which are preferably toroidal and the regulating windings 22 and 23 are wound and connected so the same current passing therethrough will generate the movement of flux in the opposite directions in their respective rings 30 and 31 as indicated by the flux arrows 22' and 23'' respectively. In the same manner the control winding 32 and the reference winding 33 induce the flux flow in both rings 30 and 31 in opposite directions as indicated by the flux arrows 32' and 33' in both the rings 30 and 31.

The antihunting coil or short-circuited coil 28 is preferably made of wire having materially greater circular mills than that of any of the other coils on the magnetic amplifier. This short-circuiting coil has the effect of dampening any rate of change in the flux and it thus avoids any attempt to hunting. The greater the change in the flux the greater the effect of the short-circuiting winding 28 in opposing such a flux change. This in turn produces a result in the control of the thyratron 3 that avoids false firing of this thyratron and thus properly releases the firing impulse with reference to the control initiated by the pickup 34 or load change on the feeder that is effective on its amplitude. By use of this magnetic amplifier one is able to effect this control without additional electronic equipment such as intermediate amplifiers.

Figure 7:
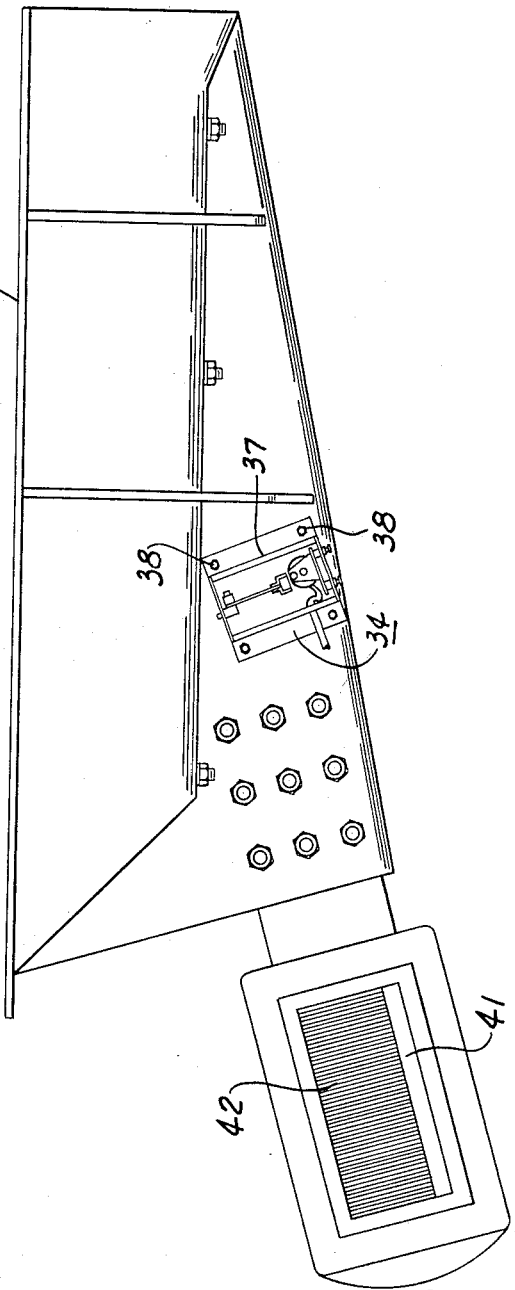
Fig. 7 is a view in side elevation of a vibratory feeder with the amplitude pickup generator or sensing device attached thereto.

The control winding 32 is supplied with a signal from the amplitude pickup generator illustrated in Figs. 4, 5 and 6 wherein the case 37 is mounted by the bolts 38 to the feeder 40 which is driven by the feeder motor 41 that contains the electromagnet indicated at 1. The feeder 40 being supported from a central portion of the leaf springs 42 that permits the feeder to reciprocate normal to the leaf springs 42 when the electromagnet 1 is energized by space current impulses. As illustrated in Fig. 7 the amplitude pickup generator 34 mounted in the housing 37 by the bolts 38 to the feeder 40 places armature 43 and its reed 44 normal to the line of reciprocation of the trough so that the maximum amplitude of the feeder trough is effective in making the reed 44 swing in its maximum amplitude. The reed 44 is selected as to size and is adjusted in the clamping block 45 so as to be lengthened or shortened to accurately tune its amplitude. The clamping block 45 is secured by the bolts 46 to the mounting block 47 that is in turn secured by the bolts 48 to the box 37. The electromagnetic coil 50 of the amplitude pickup generator 34 is set with its C shaped core 51 just to one side of the armature 43 which as indicated is in the form of a C shaped permanent magnet that is clamped by the bolts 52 at the bottom of the reed 44. The coil 50 being wound around the middle stem of the C shaped core 51 which in turn is mounted on the brackets 53 that are adjustably supported by the thread sleeve members 54 that pass through thread openings in the end of the box 37 and are locked by the nuts 55 and also the bolt members 56 which pass through the thread sleeve members into the base plate 57. As viewed in Fig. 4 any part of the base plate 57 is tiltable relative to the end of the box 37 and the bracket 53 carrying the coil 50 is likewise movable back and forth relative to the magnet 43 which is shown at rest by adjustment of the fasteners in the slots 49 of the plate 57. With this arrangement the air gap may be varied. The tilting of the pole faces of the core 51 may be effective so as to obtain a proper degree of flux cutting for the purpose of generating a signal impulse in the coil 50. The coil 50 is a single winding as indicated in Fig. 1 and is connected by the lines 58 and 59 to the opposite or A.C. sides of the bridge member 60 having rectifiers placed in the respective bridge circuits and supplying a positive current to the line 61 and a negative current to the line 62 the ends of which terminate on the control winding 32. A meter M is connected between the line 61 and 62 through a calibrating resistance 63 which when calibrated may be read to interpret the exact amplitude of the feeder. Resistance at 64 and 65 is provided to regulate the voltage generated by the pickup generator 34 which is supplied through the lines 61 and 62 to the control winding 32 and a filter condenser 66 is employed to smooth out the wave.

Referring now to the reference winding 33 as shown in Fig. 1 the transformer secondary 35 is connected through the lines 68 and 69 to the A.C. points of the reference converter or bridge 70 for the purpose of supplying positive current to the line 71 and negative current to the line 72 which are connected to opposite sides of the reference coil. One or both of these lines may be supplied with resistance members such as indicated at 73 and 74 for respectively controlling the rate or limiting the current in this circuit. A filter condenser 75 is employed between the lines 71 and 72 to smooth out the converted alternating current and a resistance is connected between the A.C. lines 68 and 69 to function as an artificial load on the secondary 35.

Figure 2:
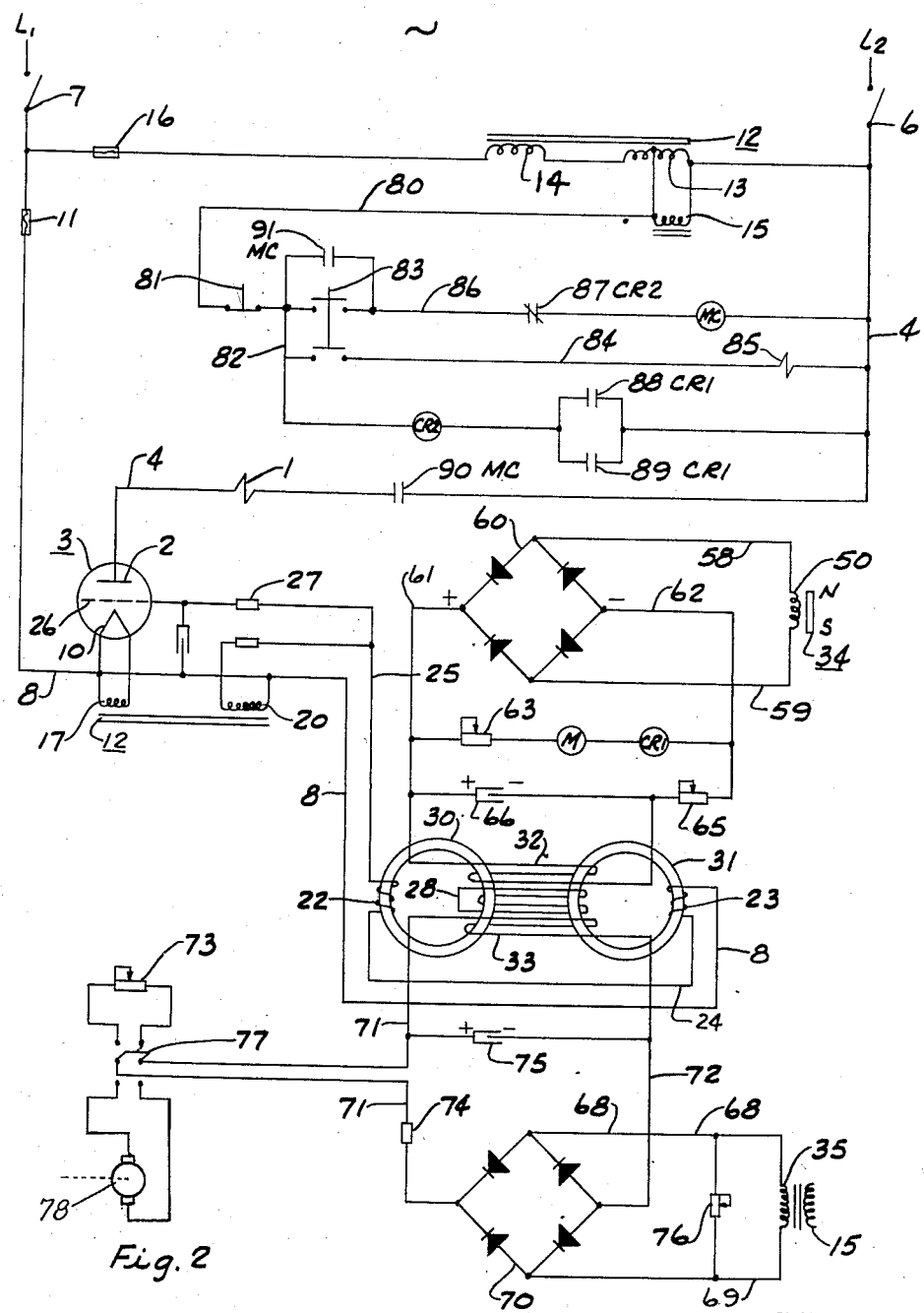
Fig. 2 is a view in the form of a circuit diagram illustrating the same invention with a different form of signal controls and circuit protection.

The circuit of Fig. 2 is substantially the same as the circuit of Fig. 1 with the exception that the transformer 12 has been rearranged for connection with a 440 volt line between the line switches 6 and 7 in place of the 220 volt line of Fig. 1. However the primaries 13 and 14 are connected in series in place of being connected in multiple and the primary 15 is connected halfway across the primary 13 so as to provide 110 volt primary for the secondary 35.

Referring specifically to the reference winding circuit in line 71 is interrupted by the transfer switch 77 which places the rate setting resistance 73 in series with the resistance 74 or to furnish another type of rate setting device 78 which may be in the form of a resistance or may be in the form of a pilot generator supplying a superimposed direct current signal necessary for the further control of the reference winding other than this change the reference circuit is the same as that described with reference to Fig. 1.

Fig. 2 shows the line 80 connected to the 110 volt tap of the primary 13 which terminates at the stop push button 81 which is closed and connects this circuit to the line 82. A start push button 83 is provided with two independent circuits connecting to line 82, one of which connects the line 84 energizing the solenoid CR1 reset coil 85 to the opposite side of the supply circuit 4. The other push button circuit connects the line 82 with the line 86 through the back contact 87 of the relay CR2 and the operating coil of the main contact to the other side of the alternating current supply 4. One end of the operating coil of relay CR2 is directly connected to the line 82 and the opposite side thereof is connected to two contacts in multiple, either of which may close the circuit of CR2 to the opposite side of the supply line 4. One of the CR contacts 88 and the other 89 are actuated to close the circuit for the CR2 operating coil if the current passing from line 61 through resistance 63 and meter M through the CR1 operating coil to the line 62 has a current of one tenth milliamp or less. The other CR1 contact 89 will close when the current through the CR1 operating circuit is over a maximum current of .9 milliamp. Thus the CR2 relay is energized if the CR1 relay receives one-tenth or less milliamp which would simulate a condition wherein the amplitude of the feeder is very low, abnormally low, indicating an extremely heavy load on the feeder and the other contact CR1 would close when the current is greater than nine-tenths milliamp through the CR1 relay indicating a condition wherein the feeder is away below the feeding rate owing to the fact that it is substantially empty. As previously stated the meter M is calibrated to read directly in proportion of the amplitude of the feeder. Thus the relay CR1 functions as a maximum minimum limiting control of the system and intermediate this maximum minimum limit control the magnetic amplifier compensates for any change in load or voltage to provide a continuous constant feed.

If the CR1 relay functions on either maximum or minimum current load the CR2 relay becomes energized which opens the back contact in the line 87 of the line 86 and thus de-energizes the master control relay main contactor to open its contact 90 in the plate circuit of the triode 26 and thus interrupt the operation of the electromagnetic motor of the feeder.

It will also be noted that the starter push button 83 has the front contact 91 in multiple therewith which functions as its own holding circuit.

It is necessary to hold the start push button 83 for a sufficiently long enough period that the CR1 reset solenoid 85 is effective in holding the CR1 contacts 88 and 89 open so as to permit the master control contactor MC to become energized through the back contact 87 of the CR2 relay. After the CR1 reset solenoid 85 has functioned to maintain the contacts 88 and 89 open, the push button 83 is then released as there is sufficient magnitude in the operation of the feeder 1 to permit the main operating circuit of the CR1 relay to maintain the contacts 88 and 89 open because it resides within the upper and lower maximum current limits.

The resonant frequency of the reed 44 of the magnetic pickup generator is designed to be somewhat lower or higher than its operating frequency. This reed is designed to operate on a linear portion of the amplitude versus frequency curve so that any slight variation of frequency of the vibratory feeder or other vibratory device which drives the same and to which it is attached will have a negligible effect on the output of this generator. The length of the reed or its resonant frequency may be changed by adjusting the same under the clamping bar 45 and the air gap may be adjusted by adjusting the coil as previously stated. The voltage induced in this coil due to the flux lines of the permanent magnet cutting the pole faces of the core of the coil winding induces the generated voltage in the coil. Since the magnet operates near resonance its amplitude of reciprocation is many times greater than the amplitude of vibration of the feeder motor or other vibratory element driving the generator. The velocity of this permanent magnet armature is equal to the total displacement or amplitude times the frequency. Since the vibratory motion that normally operates this generator does so at a very constant frequency and if the changes in frequency are small they have a negligible effect on the output. However, the higher the amplitude of the swing of the permanent magnet the greater the velocity is attained and since the electromotive force produced is equal to the number of turns multiplied by the rate of change or velocity, of the flux linkage through the coil, it follows that due to the increased velocity, the output of the coil will be greater, thus the relatively high electrical output of this generator has many advantages as compared with other seismographic types of amplitude transducers. With this type of generator no amplification is necessary and it is very sensitive for controlling a circuit of the character disclosed. Again due to the high output of this generator it is not affected by normal electrical stray pickup interference. It is also insensitive to heavy masses of material striking the feeder trough which would be termed as a mechanical transient. Since this generator possesses a high degree of linearity it provides excellent characteristics for purposes of indication and control.

Such a control by the generator is made directly through the converter in the form of the full wave rectifier to the control winding of the magnetic amplifier. The short-circuited winding of this magnetic amplifier 28 in combination with a core with the other coil configurations provides a unique characteristic of having a coupling with the other coils which surround both cores but does not have a coupling with the series connected coils in the form of the regulating windings 22 and 23 which surround only individual cores.

The short-circuited winding 28 therefore has no current circulating as a result of the alternating current flow in the A.C. series windings 22 and 23. Likewise since the control and reference windings 32 and 33 are energized with direct current, there will be no voltage induced from these windings into the short-circuited winding 28 under a steady state of conditions of direct current flow from the control and reference converters. However, the short-circuited winding 28 has a characteristic of opposing any abrupt change of the magnitude of the magnetic flux passing through both cores 30 and 31 and thus will tend to maintain the net control flux magnitude constant in these cores thereby introducing a timed delay bottom, the response of the magnetic amplifier and the demand signal tending to produce this response. The effect of this short-circuited winding therefore is the introduction of the dynamic dampening into the closed loop servosystem of which the magnetic amplifier forms a part. Any sensitive tightly coupled closed loop servosystem has an inherent tendency to hunt and this short-circuited winding provides dynamic dampening to thereby avoid hunting. The system and the degree of dampening may be varied by changing the cross sectional area or the circular mills of the wind employed in the short-circuited winding 28 together with the number of turns thereof. The current in the control winding 32 produces unidirectional fluxes in both cores. These fluxes are dynamic in nature and combine with the fluxes produced in both cores by the reference winding which is in the opposite direction and the total result produces a net value of flux that is also dynamic in nature and is effective on the short-circuited winding which is closely coupled thereto. The reference winding 33 produces in both cores a constant value of flux that is below the level of saturation of the cores. This value of flux is set by the variable resistance 73 and permits the regulating windings to saturate the cores during their positive half cycles of current. The control winding produces a flux which is proportional to the feeder amplitude and in a direction which is opposite to the flux produced by the reference winding. The flux produced by the control winding will never exceed that value required to completely cancel the flux produced by the reference winding. If the operating voltage increases or the load on the feeder decreases the feeder amplitude will tend to increase which increases the flux in the control winding thereby causing the resultant flux to decrease in the cores of the magnetic amplifier. The regulating winding then saturates the cores at a higher value of current than before which results in a grid wave form that fires the thyratron tube slightly later in the cycle to decrease the current to the feeder and prevent its amplitude from increasing.

Conversely, if the line voltage decreases or the load on the feeder increases then the feeder amplitude tends to decrease which decreases the flux in the control winding thereby causing the resultant flux in the cores to decrease. The flux from the regulating winding then saturates the cores at a lower flux saturation than before which results in a grid wave form which fires the thyratron tube slightly earlier in the cycle to increase the current to the feeder and preventing its amplitude from decreasing. Circuit constants are adjusted to provide linear operation over excessively wide voltage variations. The circuit is extremely sensitive due to this type of dual toroidal core construction. Thus the magnetic amplifier in combination with the direct current generator produces a combination in a control circuit that is rugged, accurate and very difficult to upset or produce false indications.

We claim:

1. A current impulse controller consisting of a triode having an anode circuit for supplying current impulses to an operating circuit, a control grid with a limiting resistor and cathode for said triode, a magnetic amplifier having two superimposed magnetic ring cores, a grid control regulating winding on each core connected in series with one end of one coil connected to the grid resistance and the other end of the other coil connected to the cathode, a saturation control A.C. voltage source connected in multiple with said regulating windings, a short-circuited winding wound around both of said cores, a reference and a control winding each wound around both cores, means to provide a constant D.C. supply voltage connected across the reference winding, means to provide a D.C. control pickup voltage for supplying current to said control winding, the current of said D.C. control pickup being a function of the operation of said operating circuit.

2. The structure of claim 1 characterized in that said means to provide D.C. supply voltage for said reference winding also includes a variable resistance to regulate the level of saturation in both cores to set the designed amplitude of the current impulse supplied to the operating circuit.

3. The structure of claim 2 which also includes a pilot generator for supplying a D.C. signal from other apparatus cooperating with the apparatus fed by said operating circuit, and switch means to alternately place the output of said pilot generator and said variable resistance to regulate the level of saturation in both cores through said reference winding.

4. The structure of claim 1 characterized in that said means to provide D.C. supply voltage connected across the reference winding is an A.C. reference converter comprising an A.C. supply voltage having a variable artificial load and a bridge rectifier connected in multiple, the direct current circuit of the bridge having a limiting resistance and a filter condenser.

5. The structure of claim 1 characterized in that said means to provide D.C. control pickup voltage for supplying current to said control winding includes a control converter comprising a pickup generator supplying a full wave bridge rectifier with its output connected to a voltage control and filter condenser.

6. The structure of claim 1 which also includes a calibrated meter across said D.C. control pickup voltage to read the true amplitude resulting from the current impulses supplied by the triode in said operating current.

7. The structure of claim 1 characterized in that said operating circuit includes an electrically actuated feeder motor and said means to provide D.C. control pickup voltage for supplying current to said control winding is in the form of an amplitude generator actuated by said feeder motor.

8. The structure of claim 7 characterized in that said amplitude generator is provided with a permanent magnet armature actuated by said feeder motor and an electromagnetic field pickup coil supplying current pulsations in accordance with the action of said permanent magnet armature.

9. The structure of claim 8 characterized in that said armature is supported on the free end of a reed that is reciprocated in timed relation to said current impulses in the operating circuit.

10. The structure of claim 9 characterized in that said electromagnetic field pickup coil is adjustably positioned relative to said permanent armature to be at one side thereof when the armature is at rest and substantially only half the amplitude of the armature is over the pole faces of the electromagnetic field.

11. The structure of claim 1 characterized in that said short circuit winding is heavier and of more circular mills than the wire of the other windings.

12. The structure of claim 1 characterized in that the regulating windings are each connected and wound so that the induced flux from each coil is in opposite direction in the superimposed cores.

13. The structure of claim 1 characterized in that said cores are toroidal.

14. The structure of claim 1 characterized in that said control and reference windings are wound and connected to induce opposing flux flow.

15. The structure of claim 1 which also includes a master control relay and a maximum and minimum control relay, a front contact of the master control relay in said operating circuit, and front contacts of said maximum minimum control relay effective in interrupting the operating circuit of said master control relay if the voltage across the control winding exceeds or falls below predetermined values.

16. The structure of claim 15 which also includes a third control relay having its back contact in series with the master control relay and having its operating circuit actuated by the contacts of said maximum minimum control relay.

17. A vibratory amplitude control consisting of, a vibratory motor means which when energized produces a vibration at a predetermined amplitude to perform work, a vibratory generator mounted to be driven by the vibrations produced by said vibratory motor means, a magnetic amplifier having a control winding and a reference winding both wound on the same two cores each of which has a regulating winding which are connected in series, a supply of constant current for said reference winding, a triode with grid and anode voltage supply for operating said vibratory motor means, said series connected regulating windings connected in multiple with said grid supply voltage to control the triode, an electrical control circuit connecting said vibratory generator to said control winding to regulate the operation of said vibratory motor means by the current generated by said vibratory generator to control said vibratory motor means through said magnetic amplifier in producing a constant amplitude of vibration regardless of voltage, load and temperature variations.

18. A vibratory amplitude control for a vibratory motor means which when energized through a triode having grid and anode voltage supply produces a vibration at a predetermined amplitude to perform work, characterized by a magnetic amplifier having a control winding and a reference winding both wound around the same two cores and each core having a regulating winding which are connected together and in multiple with said grid supply voltage, a reference supply current for said reference winding, a vibratory generator mounted to be driven by the vibrations produced by said vibratory motor means, and a disc type rectifier connected in a full wave bridge circuit to receive the generated current directly from said vibratory generator to rectify the same and supply it directly to said control winding.

19. The vibratory amplitude control of claim 18 characterized in that said reference supply current is delivered directly from a dry disc type rectifier connected in a full wave bridge circuit and energized by an alternating current of the same source supplying the anode voltage.

20. The vibratory amplitude control of claim 18 characterized by a short-circuited winding wound around both of said cores.

References Cited in the file of this patent

UNITED STATES PATENTS

| | | |
|---|---|---|
| 2,323,081 | Baird | June 29, 1943 |
| 2,366,415 | Lindsay | Jan. 2, 1945 |
| 2,529,450 | Hornfeck | Nov. 7, 1950 |